United States Patent
Dubois et al.

(10) Patent No.: US 7,115,307 B2
(45) Date of Patent: Oct. 3, 2006

(54) NEMATIC LIQUID CRYSTAL MIXTURES FOR BISTABLE DISPLAY DEVICE

(75) Inventors: Jean Claude Dubois, Bullion (FR); Didier Gallaire, Orsay (FR); Stéphane Joly, Neudon la Foret (FR); Ivan N Dozov, Gif sur Yvette (FR); Philippe Martinot-Lagarde, Marloussis (FR); Daniel N Stoenescu, Orsay (FR)

(73) Assignee: Nemoptic, Magny les Hameaux (FR)

(*) Notice: Subject to any disclaimer, the term of this patent is extended or adjusted under 35 U.S.C. 154(b) by 67 days.

(21) Appl. No.: 10/788,193

(22) Filed: Feb. 25, 2004

(65) Prior Publication Data

US 2004/0188654 A1 Sep. 30, 2004

(30) Foreign Application Priority Data

Feb. 26, 2003 (FR) .................. 03 02332

(51) Int. Cl.
*C09K 19/20* (2006.01)
*C09K 19/12* (2006.01)
*C09K 19/30* (2006.01)
*G02F 1/13* (2006.01)

(52) U.S. Cl. ............. 428/1.3; 252/299.63; 252/299.66; 252/299.67; 252/299.01; 252/299.64; 252/299.65; 252/296.66; 349/41; 349/186

(58) Field of Classification Search ........... 252/299.01, 252/299.61, 299.63, 299.64, 299.65, 299.66, 252/299.67; 428/1.1, 1.3
See application file for complete search history.

(56) References Cited

U.S. PATENT DOCUMENTS

| 4,450,094 A | 5/1984 | Sato |
| 4,818,428 A | 4/1989 | Scheuble |
| 4,886,621 A | 12/1989 | Sage |
| 5,413,734 A | 5/1995 | Buchyecker et al. |
| 2002/0003226 A1 | 1/2002 | Heckmeier et al. |
| 2002/0030180 A1 | 3/2002 | Tarumi et al. |
| 2006/0054858 A1* | 3/2006 | Francis et al. ......... 252/299.01 |

FOREIGN PATENT DOCUMENTS

| DE | 3906038 A1 | 9/1989 |
| DE | 10053896 A1 | 5/2001 |
| DE | 10133867 A1 | 4/2002 |
| EP | 1298184 | 4/2003 |
| GB | 2250748 | 6/1992 |

* cited by examiner

*Primary Examiner*—Shean C Wu
(74) *Attorney, Agent, or Firm*—Blakely Sokoloff Taylor & Zafman

(57) ABSTRACT

Nematic liquid crystal mixtures with weak zenithal anchoring energy for bistable display devices, comprising at least 40% by weight of compounds with strong molecular polarisability and strong dipole moment.

7 Claims, 3 Drawing Sheets

NEMATIC LIQUID CRYSTAL MIXTURES FOR BISTABLE DISPLAY DEVICE

This invention relates to the production of nematic liquid crystal mixtures with weak zenithal anchoring designed to optimise the characteristics of devices using breaking of this anchoring and particularly bistable display devices.

STATE OF THE ART

Liquid crystal display (LCD) devices are increasingly used in display applications for which there are constraints on the volume, weight or electricity consumption. Therefore, they are found in all sorts of mobile applications, for example laptop computers, electronic books, personal assistants and mobile phones.

1) ANCHORING OF MOLECULES IN "CLASSICAL" DISPLAYS

Figure 1:
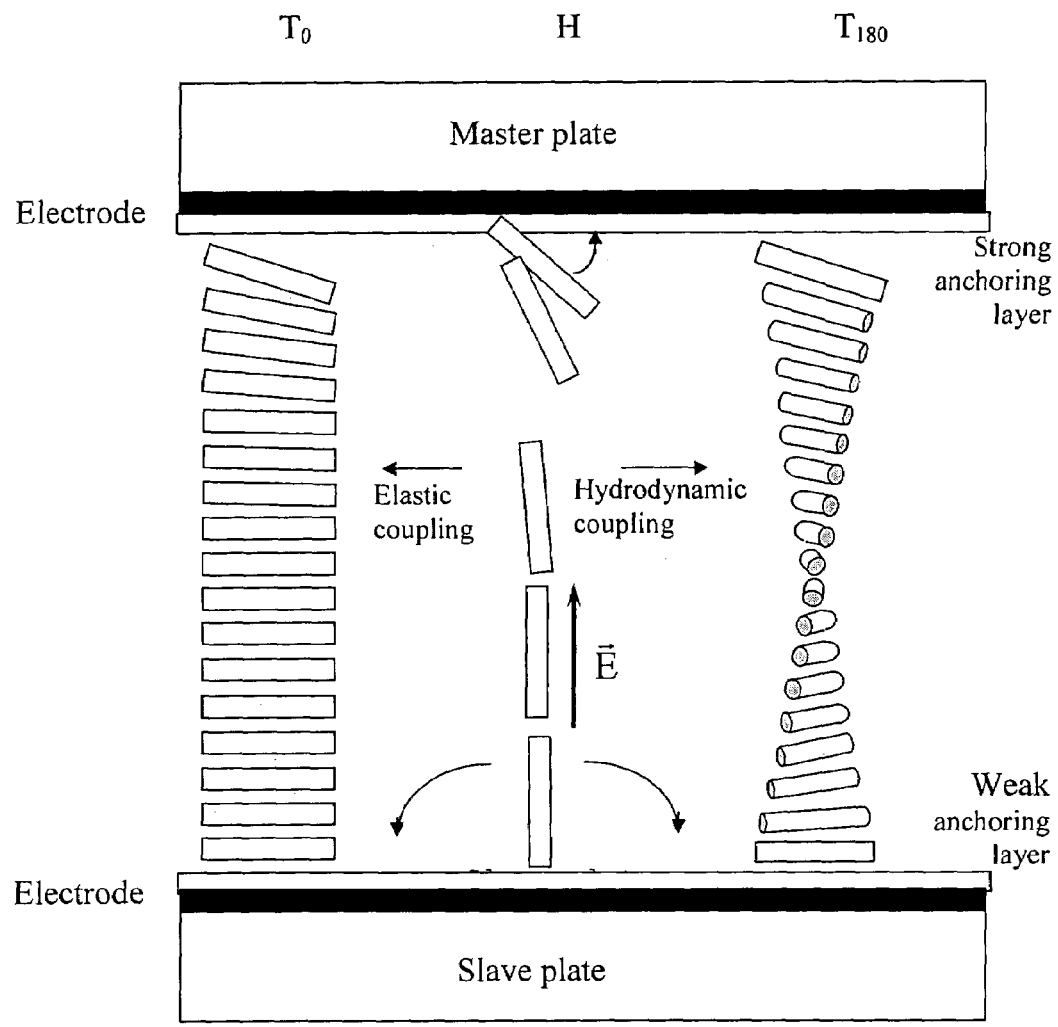
FIG. 1 shows the diagram of the bistable display by anchoring breaking.

In their simplest form, electrically controlled display devices comprise a liquid crystal material confined between two plates, at least one of which is transparent. Each of these plates is provided with an electrode on its internal face and was subjected to a surface treatment that orients the liquid crystal. It is said that this treatment anchors the molecules on the walls of the cell. By applying a potential difference exceeding a voltage called the Fréedericksz threshold voltage between the electrodes of the two plates, the orientation of the liquid crystal varies under the action of the electric field. Due optical anisotropy of the liquid crystal, these orientation variations change the optical properties of the display depending on the amplitude of the applied field.

All these displays called "classical" displays have a common characteristic; when the external electric field is switched off, the displayed information disappears more of less quickly. The anchoring is strong, it fixes the orientation of the molecules close to the plates, and keeps them almost parallel to the plates while the field is applied. When the field is switched off, these fixed molecules reorient the other molecules according to the equilibrium texture. The elasticity of the liquid crystal, associated with the strong anchoring of molecules onto the plates, makes the deformation created by the field, and therefore all information, disappear.

A large amount of work has been done to improve the performances of these classical displays by optimising the physical properties of the liquid crystal including the temperature range, viscosity, elasticity, birefringence, dielectric anisotropy, Fréedericksz threshold voltage, etc. It is almost impossible for a pure product to satisfy all requirements. This is why mixtures comprising more than about ten components are generally used in display devices to optimise all "volume" properties of the liquid crystal [Handbook of Liquid Crystals (1998) Wiley-VCH Weinheim].

Furthermore, for these classical devices, the anchoring condition is not very strict, all that is necessary is that this anchoring should be "strong", in other words larger than a limiting value ($L_z$<15 nm according to the definition given below). Research has been done on this problem in obtaining strong anchoring, but it can be considered to be almost solved at the moment. Several known polymer families arranged in the surface layer on plates provide strong anchoring adapted to classical displays [Liquid Crystals—Applications and Uses (1990) World Scientific Publishing Co. Pte. Ltd Singapore].

2) Bistable Nematic Displays

A new generation of nematic displays called "bistable" nematic displays appeared a few years ago; they operate by switching between two stable states in the absence of a field. The external electric field is only applied for the time necessary to switch the texture of the liquid crystal from one state to the other. If there is no electric control signal, the display remains in its existing state. Due to its operating principle, this type of display consumes an amount of energy proportional to the number of image changes; thus when the frequency of image changes drops, the power necessary for operation of the display tends towards zero. This type of display is developing quickly due to expansion of the market for mobile devices.

3) Bistable Displays with Anchoring Breaking

Several types of bistable displays require that the liquid crystal molecules can change orientation close to plates and can easily change from being parallel or almost parallel to these plates, to being perpendicular or almost perpendicular to them. The display device developed by the ZBD Displays Ltd. Company (G. P. Bryan-Brown et al., Nature, 399, 338 (1999)) is typical: in one of the bistable states, the molecules close to one plate are parallel to it on average; in the other state, they are perpendicular to it. Switching requires easy changing between these two states. For other displays, during switching, the electric field makes the molecules close to one or both of the two plates of the device change from being almost parallel to the plates to become almost perpendicular to them. It is said that these devices are switched by anchoring breaking.

Two bistable nematic displays with anchoring breaking using bistable surfaces have been proposed by the Orsay Solid State Physics Laboratory, one selects the stable state after switching by a flexoelectric effect (patent application FR 90 07847), and the other by an electro-chiral effect (patent application FR 90 01066).

Two bistable nematic displays with anchoring breaking on monostable surfaces are being developed at the moment: the BINEM® display developed by the NEMOPTIC Company in France (patent applications FR 95 13201 and FR 96 04447 and U.S. Pat. No. 6,327,017) or the SBiND display developed by the LICET Company in Italy (patent application EP 0 773 468 and U.S. Pat. No. 5,995,173 and patent application JP 9 274 205).

Switching of the BINEM® bistable display by anchoring breaking is diagrammatically shown in FIG. 1; it uses two textures, one uniform or slightly twisted texture $T_0$ in which the molecules are approximately parallel to each other, and the other $T_{180}$ that differs from the first by a twist of +/−180°. The nematic is chiralised with a spontaneous pitch $p_0$, chosen to be close to four times the thickness of the cell to equalise the energies of the two textures. In the absence of a field, these are minimum energy states; the cell is bistable. In the presence of a strong field, an almost homeotropic texture (H) is obtained, and anchoring of the molecules is broken on at least one of the plates; neighbouring molecules are normal to it. At the end of the control pulse, the cell returns to one of the two textures depending on the rate at which molecules close to the surface, for which anchoring is not broken, return to an equilibrium. A slow return will lead to state $T_0$ by elastic coupling between molecules close to the two surfaces, and a fast return will lead to state $T_{180}°$ by hydrodynamic coupling.

4) Nematic Mixtures for Displays with Anchoring Breaking

Displays with anchoring breaking that we have just mentioned and in general all bistable displays using switching on the surface, require weak and well-defined zenithal anchoring of the liquid crystal on it. Molecules on plates can then be aligned under the action of a reasonable breaking field compatible with the control circuits. Remember that the breaking field that aligns molecules attached to the surfaces is obviously greater than the field corresponding to the Fréedericksz threshold voltage which simply rotates molecules at the centre of the cells, and has almost no influence on the orientation of molecules close to the plates. Operation of anchoring breaking displays depends very closely on the "surface" properties of the nematic mixture. These physical properties (angles and anchoring force) characterise interaction of the liquid crystal with the alignment substrate.

Liquid crystals used by promoters of bistable nematic displays often belong to the cyanobiphenyls family, and they cannot be used to make devices operating within a wide temperature range. Furthermore, weak anchoring is often obtained on plates covered by mineral materials deposited by evaporation, this process being much more expensive than the usual polymer treatments. Normal materials and industrial surface treatments used for classical displays result in very strong anchoring and therefore cannot be used directly for bistable displays.

The production of bistable displays for practical, industrial or general public applications requires liquid crystal mixtures with a new property, namely weak zenithal anchoring. They also need to maintain more classical but essential volume properties; they must remain nematic within a wide temperature range and their mechanical, electrical and optical properties must be adjustable to satisfy the needs of the different bistable displays.

a) The Necessary Bulk Properties

The following gives a summary description of the volume properties of liquid crystal materials adapted to bistable displays.

In general, pure products are nematic within a restricted temperature range. The maximum value of this temperature range $\Delta T_N$ is limited by $T_{N\text{-}I}$, the nematic liquid crystal⇌isotropic liquid transition temperature, and the minimum value is limited by $T_{X\text{-}N}$, the transition temperature towards more ordered liquid crystal phases or vitreous or crystalline solid phases.

$$\Delta T_N = T_{N\text{-}I} - T_{X\text{-}N}$$

A wide temperature range is necessary for most applications, typically of the order of 50° C. to 80° C. centred on the ambient temperature (20° C.). In order to optimise the temperature range, the liquid crystal materials used must be composed of several components chosen from among chemical families with nematic ranges sufficiently offset in temperature and for which the distribution of molecular lengths hinders crystallisation. In practice, the number of components may be as high as a dozen to adjust the various mixture volume properties, while giving the required temperature range.

A good optical contrast of the display requires clearly defined birefringence of the mixture. The cell thickness for bistable displays with anchoring breaking is small; strongly birefringent mixtures are necessary ($\Delta n$=0.15 to 0.2). The mixture must include a high proportion of very anisotropic materials. The value of birefringence is critical but its adjustment is easy since birefringences of the different components of the mixture are added in proportion to their concentrations.

The display switching time is proportional to the viscosity of the material and is inversely proportional to its elasticity. In mixtures, it is known that highly anisotropic materials give high elastic constants, and also a high viscosity. The viscosity of the mixture may be reduced by slightly anisotropic additives with low viscosity that hinder the dimerisation of anisotropic materials. This will be essential to obtain response times of a few milliseconds necessary for applications, at low temperature.

Thus, nematic liquid crystals for displays with anchoring breaking should be mixtures composed of several mesomorphic materials; this is the only known method of obtaining the different volume properties necessary. Their diversity must not hinder the essential new property; weak zenithal anchoring. Furthermore for some applications, and particularly in the case of materials for BINEM® displays, it will be necessary to add a chiral additive to the mixture to obtain an infinite bistability.

b) Practical Definition of Weak Zenithal Anchoring

Figure 2:
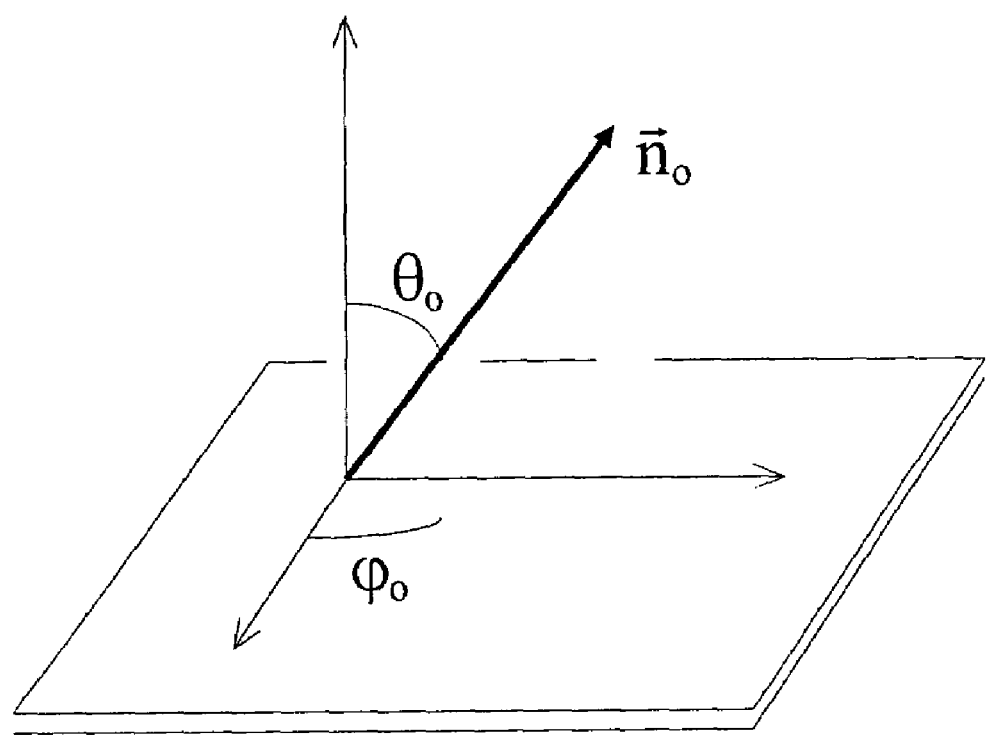
FIG. 2 shows the direction of easy axis $n_0$ is defined by the azimuth angle $\Phi_0$ and zenithal angle $\theta_0$.

The anchoring and anchoring breaking concepts for liquid crystal molecules on surfaces are highly technical, and they can be defined. The orientation of the liquid crystal molecules by surfaces is called anchoring. The source of anchoring is anisotropy of the interaction between the liquid crystal and the surface. Anchoring can be characterised by its efficiency and by the preferential direction imposed by the surface on adjacent liquid crystal molecules. This direction, called the easy axis, is defined by the azimuth angle $\Phi_0$ and the zenithal angle $\theta_0$, (see FIG. 2). The nematic director, in other words the average direction of liquid crystal molecules, is drawn towards the easy axis through the surface. If there is no external influence, the liquid crystal director is oriented parallel to the easy axis to minimise the interaction energy with the surface. This energy (anchoring energy) may be written as follows as a first approximation (A. Rapini and M. Papoular, J. Phys. (Fr) C4, 30, 54–56 (1969)):

$$g(\theta, \varphi) = \frac{W_z}{2}\sin^2(\theta - \theta_0) + \frac{W_a}{2}\sin^2(\varphi - \varphi_0) \qquad (1)$$

where $\theta$ and $\Phi$ are the zenithal angle and the azimuth angle of the nematic director on the surface, $W_z$ and $W_a$ are the surface densities of the zenithal and azimuth anchoring energies. To simplify the description, we will call them anchoring energies. On most solid surfaces, the zenithal anchoring energy is one or two orders of magnitude higher than the azimuthal anchoring energy. The azimuthal anchoring energy depends mainly on anisotropy induced on the surface by treatments, and in this case the nature of the materials is not as important. In this case we are only interested in the zenithal anchoring energy $W_z$.

If the orientation of the director in the volume is different from the direction of the easy axis, the texture is deformed.

The surface energy is no longer zero and the result is also a volume energy, characterised by an elasticity factor K that depends on the deformation. The surface energy can be characterised by its extrapolation length that is the ratio between the bulk elasticity factor and the anchoring energy. The extrapolation length of the zenithal anchoring is denoted $L_z = K_{33}/W_z$. In practice, a zenithal anchoring is considered as being strong if $L_z < 15$ nm and weak if $L_z > 25$ nm.

The orientation of liquid crystal molecules may be modified by external, electrical or magnetic fields. For example, for an electric field normal to the surface, positive anisotropic molecules are oriented along the field ($\theta = 0°$) in the body of a cell in which they would be flat ($\theta \cong 90°$) in the absence of a field. On the surface, the director zenithal angle reduces continuously as a function of the field, and $\theta$ becomes zero if the field exceeds the critical field $E_c$. It is said that the anchoring is broken, since the director close to the surface is no longer affected by an anchoring torque or an electric torque. The critical field is:

$$E_C = \frac{W_z}{\sqrt{K_{33} \Delta \varepsilon}} \quad (2)$$

where $W_z$ is the zenithal anchoring energy, $K_{33}$ is the bending elasticity factor and $\Delta\varepsilon$ the dielectric anisotropy.

This critical field is the field that must be applied to switch anchoring breaking devices. It is also the order of magnitude of the field necessary to change the orientation of the director close to surfaces in the case of devices in which breaking is not necessary. Mixtures with a high value of $\Delta\varepsilon$ and high elasticity but a weak anchoring energy are necessary to obtain a device control field compatible with the control electronics.

In practice, the useful magnitude in the case of anchoring breaking displays is the voltage necessary to break them, therefore the critical field multiplied by the thickness of the cell. Cells of bistable displays are usually thick enough so that their birefringence is equal to the half wavelength of light at the centre of their passband. We will characterise zenithal anchoring using the voltage $U_{\lambda/2}$ at the terminals of a birefringence cell $\lambda/2$ for the yellow sodium line, when the field close to the surface is equal to the critical anchoring breaking field:

$$U_{\lambda/2} = \frac{\lambda W_z}{2\Delta n \sqrt{K_{33}\Delta\varepsilon}} = \frac{\lambda}{2\Delta n L_z}\sqrt{\frac{K_{33}}{\Delta\varepsilon}} \quad (3)$$

In this relation, $\lambda = 589$ nm is the wavelength of sodium, $W_z$, $L_z$, $\Delta n$, $K_{33}$ and $\Delta\varepsilon$ are parameters of the liquid crystal mixture, in particular its zenithal anchoring energy, its zenithal anchoring extrapolation length, its birefringence for the sodium line, its bending elasticity constant and its dielectric anisotropy, respectively.

The inventors consider that zenithal anchoring is weak when the breaking voltage $U_{\lambda/2}$ can be supplied, within the temperature range, by inexpensive electronic circuits. In practice, this can be represented by the empirical rule stating that anchoring is weak if $U_{\lambda/2} < 25$ volts.

c) Criterion of the Influence of the Liquid Crystal Material on the Anchor

The zenithal anchoring energy depends on. treatments and the nature of the surface, the temperature and the liquid crystal material used. The inventors studied the influence of the material on zenithal anchoring, eliminating the influence of other parameters as. far as possible.

The surfaces used in practice in liquid crystal cells also provide a non-zero azimuth anchoring. Most applications require that the azimuth direction of molecules on each plate is well defined so that the texture has the required optical properties. This azimuth anchoring is obtained industrially by brushing the polymer film covering the plate. The inventors discovered that the influence of brushing on the zenithal anchoring can be neglected as a first approximation.

The nature of the surface can make the zenithal anchoring energy vary by an order of magnitude. NEMOPTIC has developed polyvinyl chloride copolymer films (patent application FR 00 16135) on which the zenithal anchoring of pentyl-cyanobiphenyl (5CB) is weak ($L_z > 25$ nm at +20° C.). On the other hand, polyimides used in classical displays give strong zenithal anchoring. For example, on a commercial polyimide orientation film (Nissan SE140), zenithal anchoring of 5CB is very strong ($L_z \cong 7$ nm to +20° C.). However the inventors have demonstrated that usually the surfaces that give the weakest anchoring for one liquid crystal will also give the weakest anchoring for many other liquid crystals. The inventors chose two surfaces with very different natures as being standard surfaces and they tested the zenithal anchoring energy of the liquid crystals studied for these two surfaces, to minimise the effect of the nature of the surface. These surfaces were chosen from surfaces for which the anchoring energy of 5CB is weak; a film of silicon monoxide (SiO) evaporated obliquely under vacuum and a brushed polymer film.

The SiO film is obtained by evaporation at 75°, it is 6 nm thick and at 20° C. it provides weak zenithal anchoring of the 5CB ($L_z = 31.3$ nm which gives $U_{\lambda/2} = 14$ volts according to equation (3)).

The brushed polymer film is denoted BP11, it is copolymer film of polyvinyl chloride prepared using the process described in patent application FR 00 16135. It provides weak zenithal anchoring of 5CB at 20° C. ($L_z = 27.5$ nm, therefore $U_{\lambda/2} = 16$ volts).

Figure 3:
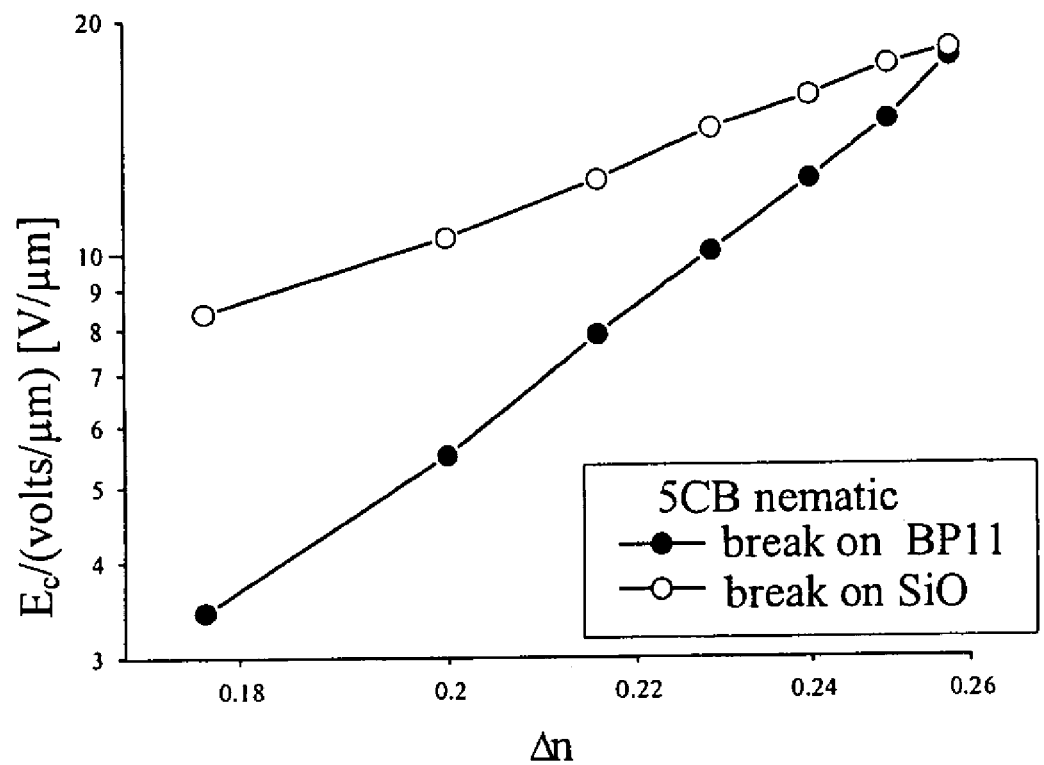
FIG. 3 shows the critical breaking field $E_c$ of the 5CB and two references as a function of the birefringence $\Delta n$.

When the temperature decreases, the anchoring energy increases for all surface-liquid crystal pairs. This behaviour is explained by the reinforcement of the nematic order at low temperature, this order being transmitted close to the surface. The graph in FIG. 3 shows the critical breaking field $E_c$ of the 5CB nematic on our two reference surfaces as a function of the birefringence $\Delta n$ that is proportional to the order parameter (S). It is observed that the breaking thresholds depend more strongly on the nematic order on the polymer than on the silicon monoxide. The value of the parameter $\alpha$ for the approximation $E_c \sim S^\alpha$ is equal to approximately 4 (4.36±0.15) for the brushed polymer and 2 (2.15±0.1) for silicon monoxide. To enable comparisons, measurements will be made at the same reduced temperature $T_{red} = (T_{N-I} - T)/T_{N-I} = 0.9$ (T is the Kelvin measurement temperature, and $T_{N-I}$ is the temperature of the isotropic nematic transition).

The inventors chose the value of the breaking voltage $U_{\lambda/2}$ at a reduced temperature 0.9 on the two surfaces that they took as being standard surfaces, as a criterion for comparison of the zenithal anchoring of a material. In the following, zenithal anchoring will be considered as being weak when $U_{\lambda/2}$ is less than 25 V.

Preliminary Work Done by the Inventors

1) Study of Commercial Mixtures

Using the criterion defined above, the inventors demonstrated that most commercial liquid crystal mixtures have strong anchoring; therefore they cannot be used to make bistable nematic displays with anchoring breaking.

Table 1 shows the critical voltage and the extrapolation length for different commercial products (MERCK) on a silicon monoxide film. Measurements were made at reduced temperature $T_{red}=0.9$.

TABLE 1

| Product | Breaking voltage for λ/2 cells: $U_{\lambda/2}$/volts | Extrapolation length $L_z$/nm |
|---|---|---|
| MLC-6650 | 35.5 | 10.7 |
| MLC-6806-100 | 37.7 | 16.5 |
| ZLI-1083 | 42.9 | 15.5 |
| ZLI-1132 | 51.0 | 13 |
| MLC-6809-000 | 53.5 | 14.2 |
| ZLI-1115 | 60.7 | 13 |
| MLC-6686 | 60.8 | 15 |
| MLC-6846-000 | 73.0 | 14 |
| MLC-4822 | 84.5 | 9.7 |
| MLC-6848-100 | 86.0 | 7.6 |
| MLC-13300-000 | 90.8 | 10 |
| MLC-6846-100 | 95.2 | 8.2 |
| MLC-6012 | 104.7 | 10.3 |
| MLC-6848-000 | 108.2 | 7.2 |
| MLC-6625 | >119 | <14 |
| MLC-6849-100 | >120 | 7.0 |
| MLC-12000-100 | >137 | <10 |
| MLC-5051 | 213 | 7.4 |

It can be seen that anchoring of all these mixtures is strong despite their strong dielectric anisotropy since their critical breaking voltage $U_{\lambda/2}$ is greater than 30 volts.

2) Study of Pure Compounds—Simple Mixtures

In order to make mixtures adapted to bistable displays, the inventors restarted the study from the beginning, measuring the anchoring of nematic pure compounds. They were able to select families of compounds with weak zenithal anchorings.

It is unfortunately difficult to predict the properties of mixtures starting from these results. So far, laws for variation of the anchoring energy of nematic mixtures as a function of the anchoring energy and the concentration of each of its compounds are unknown. In this problem, the important parameter is the value of concentrations of the different compounds close to the surface. These concentrations may be very different from bulk concentrations due to the segregation phenomenon. However, the inventors have identified some general trends by studying binary, ternary or more complex mixtures of materials for which they have determined anchoring energies.

Usually, in a given family of compounds and therefore for materials with similar chemical formulas in which the only difference is the length of the terminal alkyl chains, anchoring energies vary little from one material to another. When these materials are mixed, the anchoring energy of the mixture is the weighted average of the anchoring energies of the constituents of the mixture.

There are a few families with which hybrid mixtures can be made. The simple law of the weighted average may still be valid for mixtures containing materials chosen from among two families of this type. For example, it is possible to combine cyanobiphenyls and cyanophenylbenzoates to obtain mixtures for which the anchoring energy is weak and is proportional to concentrations of compounds.

a) "Poisons"

The inventors have discovered that some products, even when added in low quantities in the nematic mixture, enormously reinforce the zenithal anchoring. These products are genuine "poisons" for a mixture to be used in a display with anchoring breaking. For these products, the anchoring depends on the concentration of the "poison", according to a very strongly non-linear law. Table 2 shows the critical breaking voltage of pentylcyanobiphenyl and of pentylcyanobiphenyl doped with about 20% of different "poisons". The measurements are made using the previously defined criterion; at the reduced temperature $T_{red}=0.9$ on planar cells with λ/2 optical delay.

TABLE 2

Examples of "poisons": nematic products that strongly increase the breaking voltage $U_{\lambda/2}$ when added to the reference nematic (5CB)

| Poison concentration (% weight in the 5CB) | Nematic product (5CB + poison) | $T_{N-I}$/ °C. | $U_{\lambda/2}$/volts at $T_{red}=0.9$ |
|---|---|---|---|
| reference | 4-pentyl-4'-cyanobiphenyl (pure 5CB) | +35.0 | 14 |
| 20% | 5CB + 4-trans-propylcyclohexylcyanobenzene | +37.7 | 20 |
| 20% | 5CB + 4-pentyl-4'-cyanobicyclohexane | +44.6 | 26 |
| 20% | 5CB + 4-propylcyclohexyl-4'-thiocyanobenzene | +36.3 | 37 |
| 20% | 5CB + 4-cyanobiphenyl-4'-pentylcyclohexane | +72.0 | >40 |

The inventors found that materials in the same chemical family as the "poisons" in table 2 also reinforce anchoring. There must only be a small proportion of them in mixtures for bistable displays.

More generally, poisons have common characteristics, which provided a means of making correlations between their molecular structure and their anchoring properties. The inventors thus discovered several classes of materials that increase anchoring and that must only be present in small quantities, or must be avoided altogether in mixtures for bistable nematic displays.

Products belonging to classes DI and DII are not recommended. Their formulas are:

DI

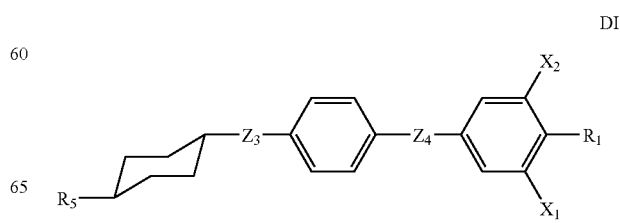

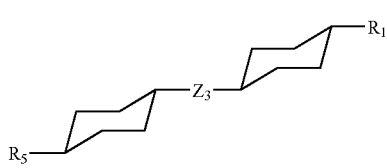

DII where:

R₁ is a —CN—, —NCS, —F or —CF₃ polar group,

R₅ is an R— or —RCOO— group, where R represents an alkyl chain containing 1 to 12 carbon atoms, Z₃ and Z₄ are identical or different, and are —C≡C—, —CH₂—CH₂— groups or simple bonds, and X¹ and X₂ are identical or different, and are atoms of fluorine, chlorine or hydrogen.

The inventors have demonstrated that these materials are "poisons" for weak zenithal anchoring. If mixtures are to have this anchoring property, they must not contain more than a very small proportion of compounds of this class, preferably less than about 5% by weight.

Products belonging to classes CI and CII reinforce anchoring to a lesser extent, but should also be avoided.

Their formulas are:

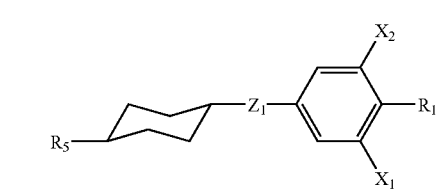

CI

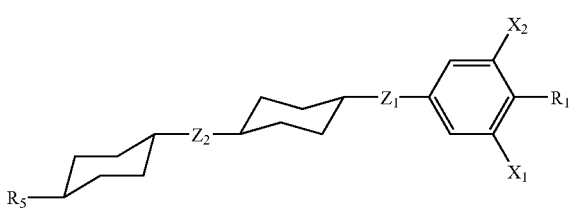

CII where:

R₁ is a —CN, —NCS, —F or —CF₃ polar group,

R₅ is an R— or —RCOO— group, where R represents an alkyl chain containing 1 to 12 carbon atoms, Z₁ and Z₂ are identical or different, and are —C≡C—, —CH₂—CH₂—, —COO—, —OCO— groups or simple bonds, and X¹ and X₂ are identical or different, and are fluorine, chlorine or hydrogen atoms.

It is important that mixtures should only contain a very small proportion of compounds of these classes, preferably less than 20% by weight, or even not at all, so that they can maintain weak zenithal anchoring.

The inventors demonstrated that all these materials are "poisons" for the weak zenithal anchoring. However, it should be mentioned that they do have some attractive properties; apart from the fact that they widen the temperature range of the mixture, they all have terminal polar groups, which enables strong coupling with the field. Their viscosity is sometimes low and they then increase the switching speed.

b) Indispensable Favourable Products

Conversely, the inventors discovered favourable products that can reduce the zenithal anchoring energy of a mixture, sometimes in a strongly non-linear manner. A small concentration may be sufficient to significantly lower the energy. Table 3 contains the critical breaking voltage of pentyl-cyanobiphenyl and of pentyl-cyanobiphenyl doped with about 20% of these materials. The measurements were made at a reduced temperature $T_{red}$=0.9 on planar cells with an optical delay λ/2.

TABLE 3

Examples of nematic products that reduce the breaking voltage ($U_{\lambda/2}$) when added to the reference nematic (5CB). Favourable products.

| Concentration (% weight in the 5CB) | Nematic product (5CB + additive) | $T_{N-I}$/° C. | $U_{\lambda/2}$/volts at $T_{red}$ = 0.9 |
|---|---|---|---|
| reference | 4-pentyl-4'-cyanobiphenyl (pure 5CB) | +35.0 | 14 |
| 19% | 5CB + 4-butylphenyl-4'-propylphenyl-ethyne | +38.3 | 10 |
| 20% | 5CB + 4-pentyl-4'-cyanoterphenyl | −73.5 | 11 |
| 20% | 5CB + 3-fluoro-4-cyanophenyl-4'-pentylbenzoate | +30.8 | 12 |
| 19% | 5CB + 5-pentyl-(1.3-dioxane)-4'-cyanophenyl | +37.5 | 12 |
| 20% | 5CB + 1-ethyl-4-propylcyclohexylbenzene | +14.5 | 13 |
| 20% | 5CB + 4-butyl-4'-thiocyanobiphenyl | +32.5 | 13.5 |

The inventors found that materials in the same chemical families as favourable products given in the example in table 3 are also favourable. They used these results and discovered several classes of materials that have weak anchorings and that can be mixed together, with the following formulas:

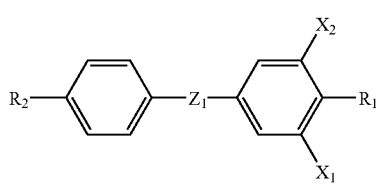

AI

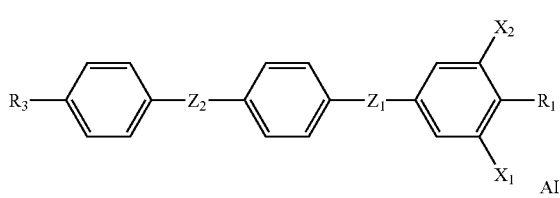

AII

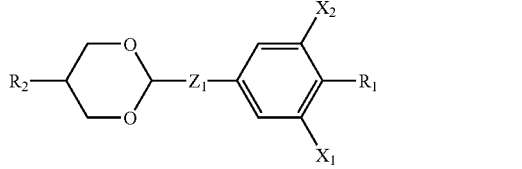

AIII

-continued

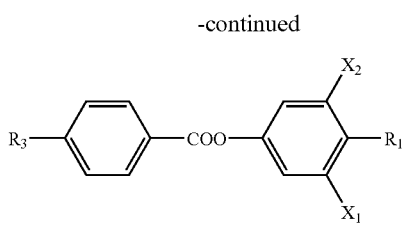

AIV where:

R₁ is a —CN—, —NCS, —F or —CF₃ polar group,

R₂ is an R—, RO— or —RCOO— group, where R represents an alkyl chain containing 1 to 12 carbon atoms, R₃ is an R—, RO— or RCOO— group, where R is an alkyl chain containing 1 to 12 carbon atoms or a cycloaliphatic radical possibly containing an alkyl chain with 1 to 12 carbon atoms, $Z_1$ and $Z_2$ are identical or different, and are —C≡C—, —CH₂—CH₂—, —COO—, —OCO— groups or simple bonds, and $X_1$ and $X_2$ are identical or different, and are fluorine, chlorine or hydrogen atoms.

Class AI includes the cyano-biphenyls family, materials that are used to demonstrate the feasibility of several bistable displays. All components belonging to class AI have molecules with two cycles and with very few exceptions (for example a few tolanes), and isotropic nematic transition temperatures of less than +50° C. Consequently, it is difficult to make an optimised mixture from AI products only. All mixtures containing this class only have weak anchoring and good coupling with the field, but their temperature ranges are insufficient for practical applications.

For example, adding 41% of heptyl-cyanobiphenyl into pentyl-cyanobiphenyl increases the nematic range ($T_{X-N}$=−2° C. and $T_{N-I}$=+37.5° C.) while making almost no change to the breaking voltage ($U_{\lambda/2}$=14.7 V at $T_{red}$=09). The transition temperature $T_{N-I}$ remains less than 50° C.; therefore it is too low for most applications.

Another example, the addition of 30% of butyl-thiocyanobyphenyl, increases the range of pentyl-cyanobiphenyl ($T_{X-N}$=+15° C. and $T_{N-I}$=+31° C.) while lowering the anchoring breaking thresholds ($U_{\lambda/2}$=13.5 V at $T_{red}$=0.9). The binary mixture thus created has weaker anchoring than the mixture of cyanobiphenyls but its transition temperature $T_{N-I}$ is always less than 50° C.

Class AII comprises longer molecules (with three or four cycles); their nematic range is greater than 100° C. Their benefit in a mixture comprising components in class AI provides a means of extending the nematic range towards high temperatures by increasing the transition temperature $T_{N-I}$ without changing the anchoring energy, or even while reducing it. The mixture of pentyl-cyanobiphenyl and pentyl-cyanoterphenyl (20%) is one example of this: $T_{X-N}$=+5° C., $T_{N-I}$=+73.5° C. and $U_{\lambda/2}$=11 V at $T_{red}$=0.9.

Class AIII is formed by phenyl-dioxanes, and they have properties very similar to the properties of materials in class AI. They are polar like these materials, and their nematic range is close to ambient temperature. However, their optical anisotropy is much weaker than that of materials in class AI. They can thus be used to adjust the birefringence of the mixture without changing the other properties. A typical value for birefringence of a cyanophenyl-dioxane is equal to 0.09, compared with 0.18 for a cyanobiphenyl. The breaking threshold of a mixture with equal proportions of 5-propyl-(1.3-dioxane)-4'-cyanophenyl and 5-pentyl-(1.3-dioxane)-4'-cyanophenyl ($T_{X-N}$=+20° C., $T_{N-I}$=+42° C.) is equal to $U_{\lambda/2}$=20 V at $T_{red}$=0.9. Note that the optimum thickness of the display for this mixture with weak birefringence is twice as much as in the case of cyano-biphenyl. The breaking voltage for a cell with the same thickness as cyano-biphenyl would be 10 V.

Molecules of class AIV materials can include two or three cycles. The temperature range varies considerably from one family to another in this class. Mixtures containing only materials in this class have wide temperature ranges.

These materials are very polar and their dielectric anisotropy can be as much as $3 \times 10^{-10}$ F/m. Their coupling with the electric field is thus very strong, which reduces the values of the breaking fields. For example, a mixture of 18% of 3-fluoro-4-cyanophenyl-4'-ethyl-benzoate, 36% of 3-fluoro-4-cyanophenyl-4'-butyl-benzoate, 18% of 3-fluoro-4-cyanophenyl-4'-pentyl-benzoate, and 28% of 3-fluoro-4-cyanophenyl-4'-trans -pentyl-cyclohexyl-carboxy-benzoate $T_{X-N}$=−25° C., $T_{N-I}$=+61° C.) has very weak zenithal anchoring breaking thresholds: $U_{\lambda/2}$=10.8 V at $T_{red}$=0.9. This mixture can give the temperature range necessary with materials from a single class (AIV). However, note that this mixture is too viscous for most applications.

Thus, in conclusion, the inventors found four classes of nematic materials with terminal polar groups with weak anchorings. Their strong dielectric anisotropy results in a high coupling with the electric field and enables switching when they are used in bistable nematic displays. The different molecular structures in the four classes control their nematic domains with temperature ranges in the Celsius scale varying from more than a hundred degrees down to negative temperatures. Compounds in these four classes can be combined to obtain mixtures with a very wide temperature range. To avoid crystallites of compounds of high temperature classes at low temperature, it is also important to mix materials in the same family, for each class; their different aliphatic chains thus will hinder crystallisation.

Anchoring properties, dielectric anisotropy and the wide nematic temperature range of the mixtures obtained with these four classes enable the production of bistable nematic displays.

c) Materials for More Sophisticated Mixtures

Mixtures with very high birefringence and very high viscosity can be made using only class A compounds with terminal polar groups. Even the phenyl-dioxanes mentioned above are incapable of reducing birefringence to below 0.09.

The inventors have discovered material classes that can complement the recipe for mixtures made using materials in classes A, so as to optimise adaptation of the viscosity and birefringence of mixtures. These classes have the following formulas:

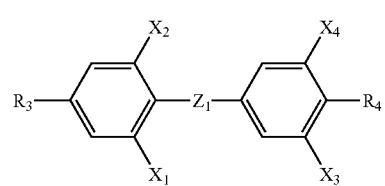

BI

-continued

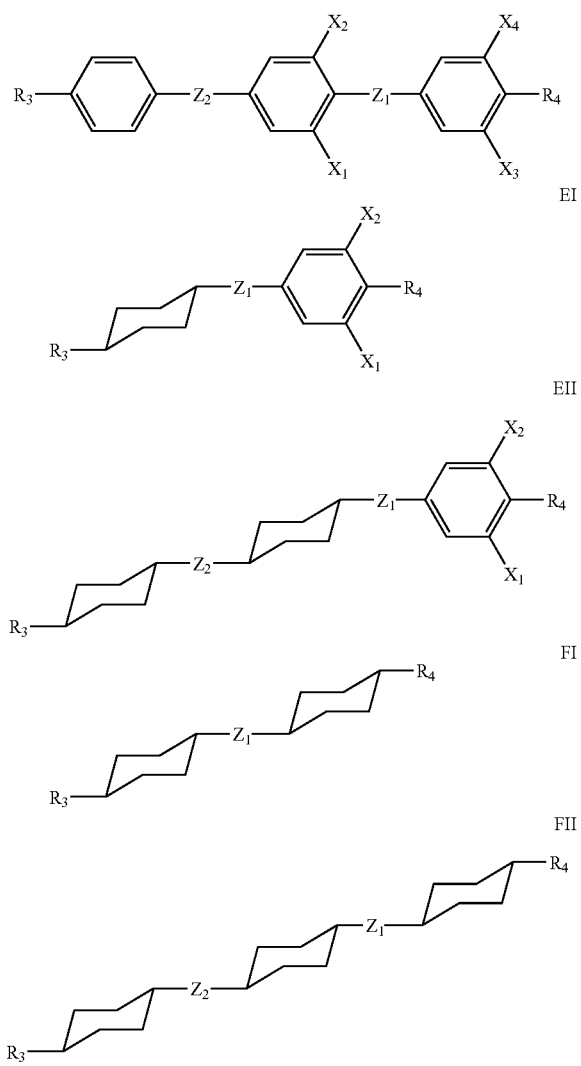

in which:

$R_3$ and $R_4$ are identical or different, and are R—, RO— or —RCOO— groups, where R represents an alkyl chain with 1 to 12 carbon atoms or a cycloaliphatic radical that may carry an alkyl chain with 1 to 12 carbon atoms, $Z_1$ and $Z_2$ are identical or different, and are —C≡C—, —CH$_2$—CH$_2$—, —COO—, —OCO— groups, or simple bonds, and $X^1$ and $X_2$ are identical or different, and are atoms of fluorine, chlorine or hydrogen, $X_3$ and $X_4$ are identical or different, and are hydrogen or halogen atoms, particularly fluorine or chlorine, or R— or RO— groups where R is an alkyl chain with 1 to 12 carbon atoms.

The inventors have shown that compounds in these classes mixed with compounds A keep the anchoring weak and can make it even weaker. These compounds strongly reduce the viscosity of the mixture and thus increase the display rate. However, since they are not polar, the materials in these classes reduce the dielectric anisotropy, and therefore coupling with the electric field. They can thus increase the value of the breaking threshold. Compounds with formula B make the anchoring weaker, prolong the nematic phase at fairly high temperatures and reduce viscosity by preventing dimerisation of A compounds. Compounds with formula E make zenithal anchoring weaker and improve miscibility of F compounds in the mixture. Compounds with the F formula strongly reduce the viscosity.

DESCRIPTION OF THE INVENTION

After completing this study, the inventors made nematic mixtures with weak zenithal anchoring energy using the previous material classes. These mixtures can give a weaker zenithal anchoring within a wide temperature range. The proportions of the various compounds in the mixture can be adjusted depending of the mechanical, electrical and optical properties necessary to optimize the different bistable displays.

Consequently, the purpose of this invention is a nematic liquid crystal mixture with a weak zenithal anchoring energy for bistable displays, involving particular compounds for which the relative proportions are determined to obtain a mixture that possesses the following simultaneously:

the new property of having weak zenithal anchoring of the liquid crystal mixture on at least one of the plates of the bistable display. This anchoring is characterised by a breaking voltage $U_{\lambda/2} < 25$ volts for a cell with thickness d such that $\Delta n\ d = 295$ nm (value measured at a temperature of +20° C.), a nematic-isotropic liquid transition temperature ($T_{N-I}$) of the liquid crystal mixture greater than or equal to +50° C., a nematic range $\Delta T_N$ of the liquid crystal mixture greater than or equal to 50° C., and a positive dielectric anisotropy larger than or equal to $8\times10^{-11}$ F/m, value measured at a temperature of +20° C.

The mixture according to the invention is made by mixing at least 40% by weight, and preferably between 60% and 90% by weight, of compounds chosen from among compounds with formulas AI, AII, AIII and AIV (group A), which is essential to provide a high dielectric anisotropy of the mixture. The use of materials in these different classes also contributes to widening the nematic temperature range.

The mixture may contain up to 50% of compounds with weak anchoring chosen from among compounds with formulas BI, BII, EI, EII, FI and FII, which can reduce the viscosity and birefringence of the mixture if necessary.

It must contain less than 20% by weight and preferably none of the compounds chosen from among the compounds with CI and CII formulas to prevent an increase in the anchoring energy. They must only be added for precise applications, for example in which the viscosity has to be reduced without reducing the dielectric anisotropy.

In particular, the mixture must not contain more than 5% by weight, and preferably none of the compounds with formula DI and DII that strongly increase zenithal anchoring.

Compounds with formulas AI to AIV, BI and BII, CI and CII, DI and DII, EI and EII, FI and FII are known (Handbook of Liquid Crystals (1998) WILEY-VCH Weinheim), but their use to make mixtures with weak zenithal anchoring suitable for bistable nematic displays has never been described.

In one advantageous embodiment of the invention:

the compounds with formula AI are chosen from the group including 4-ethyl-4'-cyanobiphenyl, 4-propyl-4'-cyanobiphenyl, 4-butyl-4'-cyanobiphenyl, 4-pentyl-4'- cyanobiphenyl, 4-hexyl-4'-cyanobiphenyl, 4-heptyl-4'-cyanobiphenyl, 4-cyanophenyl-4'-ethylbenzoate, 4-cyanophenyl-4'-propylbenzoate, 4-cyanophenyl-4'-butylbenzoate, 4-cyanophenyl-4'-pentylbenzoate, 4-cyanophenyl-4'-hexylbenzoate, 4-cyanophenyl-4'-heptylbenzoate, 4-cyanophenyl-4'-octylbenzoate, 3-fluoro-4-cyanophenyl-4'-ethylbenzoate, 3-fluoro-4-cyanophenyl-4'-propylbenzoate, 3-fluoro-4-cyanophenyl-4'-butylbenzoate and 3-fluoro-4-cyanophenyl-4'-pentylbenzoate.

the compounds with formula AII are chosen from the group comprising 4-cyanobiphenyl-4'-pentylbenzoate, 3-fluoro-4-cyanophenyl-4'-trans-pentyl-phenylbenzoate, 3-fluoro-4-cyanophenyl-4'-trans-pentyl-cyclohexyl-phenyl-carboxy-benzoate and 4-pentyl-4'-cyanoterphenyl.

the compounds with formula AIII are chosen from the group comprising 4-(5-propyl-[1.3]dioxane-2-yl)-cyanobenzene and 4-(5-pentyl-[1.3]dioxane-2-yl)-cyanobenzene.

the compounds with formula AIV are chosen from the group comprising 4-cyanophenyl-4'-trans-propyl-cyclohexyl-benzoate, 4-cyanophenyl-4'-trans-butyl-cyclohexyl-benzoate, 4-cyanophenyl-4'-trans-pentyl-cyclohexyl-benzoate, 3-fluoro-4-cyanophenyl-4'-trans-ethyl-cyclohexyl-carboxy-benzoate, 3-fluoro-4-cyanophenyl-4'-trans-propyl-cyclohexyl-carboxy-benzoate, 3-fluoro-4-cyanophenyl-4'-trans-butyl-cyclohexyl-carboxy-benzoate and 3-fluoro-4-cyanophenyl-4'-trans-pentyl-cyclohexyl-carboxy-benzoate.

the compounds with formula BI are chosen from the group comprising 4,4'-Bis-(4-propylcyclohexyl)-3-fluorobiphenyl, 4,4'-Bis-(4-propylcyclohexyl)-biphenyl and 4'-(4-pentyl-cyclohexyl)-4-(4-propyl-cyclohexyl)-biphenyl.

the compound with formula EI may for example be 4-pentylphenyl-4'-trans-pentylcyclohexycarboxylate.

Mixtures according to the invention may be prepared by any method known to those skilled in the art. For example, after assembling the compounds, the mixture will be homogenised in an isotropic phase by magnetic stirring in a water bath under a neutral atmosphere.

Another purpose of this invention is the use of a liquid crystal mixture according to the invention in a bistable display device.

Another purpose of this invention is a bistable display device using a liquid crystal mixture according to the invention.

In one advantageous embodiment of the invention, the bistable display device is a BINEM® display.

EXAMPLES ILLUSTRATING THE INVENTION

The following examples illustrate the invention without limiting its scope.

The first five examples of mixtures were made solely from products belonging to the four A chemical classes. They show that the inventors have made mixtures with weak anchoring ($U_{\lambda/2} \cong 10$ V) with these products. Compounds chosen from these various classes are necessary for the mixture to have the very wide indicated temperature range.

Example 1

| Concentration [% by weight] | Chemical class | Name of the chemical component |
|---|---|---|
| 6.4 | AI | 4-ethyl-4'-cyanobiphenyl |
| 4.1 | AI | 4-propyl-4'-cyanobiphenyl |
| 35.7 | AI | 4-pentyl-4'-cyanobiphenyl |
| 19.1 | AI | 4-heptyl-4'-cyanobiphenyl |
| 3.6 | AI and AIV | 4-cyanophenyl-4'-ethylbenzoate |
| 2.9 | AI and AIV | 4-cyanophenyl-4'-propylbenzoate |
| 5.1 | AI and AIV | 4-cyanophenyl-4'-pentylbenzoate |
| 18.4 | AIV | 3-fluoro-4-cyanophenyl-4'-trans-pentyl-cyclohexyl-carboxy-benzoate |
| 4.7 | AII | 3-fluoro-4-cyanophenyl-4'-trans-pentyl-cyclohexyl-phenyl-carboxy-benzoate |

$T_{N-I}=+67°$ C.; $T_{X-N}<-20°$ C.; $\Delta T_N>87°$ C.
$U_{\lambda/2}=15.5$ V at $T_{red}=0.9$; $U_{\lambda/2}=19.1$ V at $T=20°$ C.

Example 2

| Concentration [% by weight] | Chemical class | Name of the chemical component |
|---|---|---|
| 23.1 | AI | 4-pentyl-4'-cyanobiphenyl |
| 16.1 | AI | 4-heptyl-4'-cyanobiphenyl |
| 7.2 | AI and AIV | 4-cyanophenyl-4'-ethylbenzoate |
| 7.2 | AI and AIV | 4-cyanophenyl-4'-propylbenzoate |
| 13.1 | AI and AIV | 4-cyanophenyl-4'-butylbenzoate |
| 14.5 | AI and AIV | 4-cyanophenyl-4'-pentylbenzoate |
| 12.6 | AI and AIV | 3-fluoro-4-cyanophenyl-4'-pentyl-phenylbenzoate |
| 6.2 | AII | 3-fluoro-4-cyanophenyl-4'-trans-pentyl-cyclohexyl-phenyl-carboxy-benzoate |

$T_{N-I}=+67°$ C.; $T_{X-N}<-20°$ C.; $\Delta T_N>87°$ C.
$U_{\lambda/2}=10.8$ V at $T_{red}=0.9$; $U_{\lambda/2}=15.2$ V at $T=20°$ C.

Example 3

| Concentration [% by weight] | Chemical class | Name of the chemical component |
|---|---|---|
| 23.7 | AI | 4-pentyl-4'-cyanobiphenyl |
| 16.5 | AI | 4-heptyl-4'-cyanobiphenyl |
| 6.9 | AI and AIV | 3-fluoro-4-cyanophenyl-4'-ethylbenzoate |
| 6.9 | AI and AIV | 3-fluoro-4-cyanophenyl-4'-propylbenzoate |
| 12.8 | AI and AIV | 3-fluoro-4-cyanophenyl-4'-butylbenzoate |
| 13.9 | AI and AIV | 3-fluoro-4-cyanophenyl-4'-pentylbenzoate |
| 13.2 | AII | 4-cyanobiphenyl-4'-pentylbenzoate |
| 6.1 | AII | 3-fluoro-4-cyanophenyl-4'-trans-pentyl-cyclohexyl-phenyl-carboxy-benzoate |

$T_{N-I}=+62°$ C.; $T_{X-N}<-20°$ C.; $\Delta T_N>82°$ C.
$U_{\lambda/2}=10.1$ V at $T_{red}=0.9$; $U_{\lambda/2}=13.4$ V at $T=20°$ C.

Example 4

| Concentration [% by weight] | Chemical class | Name of the chemical component |
|---|---|---|
| 21.8 | AI | 4-pentyl-4'-cyanobiphenyl |
| 15.2 | AI | 4-heptyl-4'-cyanobiphenyl |
| 7.3 | AI and AIV | 3-fluoro-4-cyanophenyl-4'-ethylbenzoate |
| 7.3 | AI and AIV | 3-fluoro-4-cyanophenyl-4'-propylbenzoate |
| 13.3 | AI and AIV | 3-fluoro-4-cyanophenyl-4'-butylbenzoate |
| 14.7 | AI and AIV | 3-fluoro-4-cyanophenyl-4'-pentylbenzoate |
| 13.7 | AII | 3-fluoro-4-cyanophenyl-4'-pentylphenylbenzoate |
| 6.7 | AII | 4-pentyl-trans-cyclohexyl-benzoate-4'-phenyl-carboxylate of 4 cyano-3-fluorobenzene |

$T_{N-I}=+61°$ C.; $T_{X-N}<-20°$ C.; $\Delta T_N>81°$ C.
$U_{\lambda/2}=12.6$ V at $T_{red}=0.9$; $U_{\lambda/2}=14.2$ V at T=20° C.

Example 5

| Concentration [% by weight] | Chemical class | Name of the chemical component |
|---|---|---|
| 8.5 | AI | 4-ethyl-4'-cyanobiphenyl |
| 4.2 | AI | 4-butyl-4'-cyanobiphenyl |
| 29.8 | AI | 4-pentyl-4'-cyanobiphenyl |
| 3.5 | AII | 4-pentyl-4'-cyanobiphenyl |
| 8 | AI and AIV | 3-fluoro-4-cyanophenyl-4'-ethylbenzoate |
| 16 | AI and AIV | 3-fluoro-4-cyanophenyl-4'-butylbenzoate |
| 8 | AI and AIV | 3-fluoro-4-cyanophenyl-4'-pentylbenzoate |
| 14 | AIV | 3-fluoro-4-cyanophenyl-4'-trans-pentyl-phenylbenzoate |
| 4 | AIV | 3-fluoro-4-cyanophenyl-4'-trans-pentyl-cyclohexylbenzoate |
| 4 | AIV | 3-fluoro-4-cyanophenyl-4'-trans-cyclohexyl-carboxybenzoate |

$T_{N-I}=+74°$ C.; $T_{X-N}<-21°$ C.; $\Delta T_N>95°$ C.
$U_{\lambda/2}=10.1$ V at $T_{red}=0.9$; $U_{\lambda/2}=11.2$ V at T=+20° C.

For some applications, the birefringence of the previous mixtures may be too high ($\Delta n\cong 0.2$). The addition of materials belonging to B chemical classes using the groups, $X_1$, $X_2$, $X_3$ or $X_4$ provides a means of adjusting the birefringence to 0.15. The following examples show that there is a risk of reducing the temperature range.

Example 6

| Concentration [% by weight] | Chemical class | Name of the chemical component |
|---|---|---|
| 12.2 | AI | 4-ethyl-4'-cyanobiphenyl |
| 7.0 | AI | 4-propyl-4'-cyanobiphenyl |
| 29.2 | AI | 4-pentyl-4'-cyanobiphenyl |
| 15.9 | AI | 4-heptyl-4'-cyanobiphenyl |
| 6.7 | AIII | 4-(5-propyl-[1.3]dioxane-2-yl)-cyanobenzene |
| 10.7 | AIII | 4-(5-pentyl-[1.3]dioxane-2-yl)-cyanobenzene |
| 4.2 | BI | 4,4'-Bis-(4-propyl-cyclohexyl)-3-fluorobiphenyl |
| 6.1 | BI | 4,4'-Bis-(propyl-cyclohexyl)-biphenyl |
| 8.0 | BI | 4'-(4-pentyl-cyclohexyl)-4-(4-propyl-cyclohexyl)-biphenyl |

$T_{N-I}=+76°$ C.; $T_{X-N}=+17°$ C.; $\Delta T_N=59°$ C.
$U_{\lambda/2}=13.6$ V at $T_{red}=0.9$; $U_{\lambda/2}=18.4$ V at T=20° C.

Example 7

| Concentration [% by weight] | Chemical class | Name of the chemical component |
|---|---|---|
| 23.2 | AI | 4-pentyl-4'-cyanobiphenyl |
| 16.1 | AI | 4-heptyl-4'-cyanobiphenyl |
| 7.2 | AI and AIV | 3-fluoro-4-cyanophenyl-4'-ethylbenzoate |
| 7.2 | AI and AIV | 3-fluoro-4-cyanophenyl-4'-propylbenzoate |
| 13.2 | AI and AIV | 3-fluoro-4-cyanophenyl-4'-butylbenzoate |
| 14.5 | AI and AIV | 3-fluoro-4-cyanophenyl-4'-pentylbenzoate |
| 12.7 | AII | 4-cyanobiphenyl-4'-pentylbenzoate |
| 5.9 | BI | 4,4'-Bis-(4-propyl-cyclohexyl)-biphenyl |

$T_{N-I}=+61°$ C.; $T_{X-N}=+5°$ C; $\Delta T_N=56°$ C.
$U_{\lambda/2}=10.1$ V at $T_{red}=0.9$; $U_{\lambda/2}=13.2$ V at T=20° C.

Example 8

| Concentration [% by weight] | Chemical class | Name of the chemical component |
|---|---|---|
| 22.6 | AI | 4-pentyl-4'-cyanobiphenyl |
| 15.7 | AI | 4-heptyl-4'-cyanobiphenyl |
| 7.3 | AI and AIV | 3-fluoro-4-cyanophenyl-4'-ethylbenzoate |
| 7.3 | AI and AIV | 3-fluoro-4-cyanophenyl-4'-propylbenzoate |
| 13.2 | AI and AIV | 3-fluoro-4-cyanophenyl-4'-butylbenzoate |
| 14.7 | AI and AIV | 3-fluoro-4-cyanophenyl-4'-pentylbenzoate |
| 13.2 | AII | 3-fluoro-4-cyanophenyl-4'-pentyl-5-phenylbenzoate |
| 6.0 | BI | 4,4'-Bis (4-propyl-cyclohexyl)-biphenyl |

$T_{N-I}=+58°$ C.; $T_{X-N}<-10°$ C.; $\Delta T_N>68°$ C.
$U_{\lambda/2}=10.9$ V at $T_{red}=0.9$; $U_{\lambda/2}=12.9$ V at T=20° C.

Example 9

| Concentration [% by weight] | Chemical class | Name of the chemical component |
|---|---|---|
| 23.8 | AI | 4-pentyl-4'-cyanobiphenyl |
| 16.5 | AI | 4-heptyl-4'-cyanobiphenyl |
| 7.2 | AI and AIV | 3-fluoro-4-cyanophenyl-4'-ethylbenzoate |
| 7.2 | AI and AIV | 3-fluoro-4-cyanophenyl-4'-propylbenzoate |
| 13.3 | AI and AIV | 3-fluoro-4-cyanophenyl-4'-butylbenzoate |
| 14.5 | AI and AIV | 3-fluoro-4-cyanophenyl-4'-pentylbenzoate |
| 11.6 | AII | 3-fluoro-4-cyanophenyl-4'-pentyl--phenylbenzoate |
| 5.9 | BI | 4,4'-Bis(4-propyl-cyclohexyl)-biphenyl |

$T_{N-I}=+55°$ C.; $T_{X-N}<-10°$ C.; $\Delta T_N>65°$ C.
$U_{\lambda/2}=11.9$ V at $T_{red}=0.9$; $U_{\lambda/2}=12.8$ V at T=20° C.

In the following example, the inventors introduced a compound in class E to restore a very wide range of temperature, despite the presence of B materials useful to adjust the birefringence.

Example 10

| Concentration [% by weight] | Chemical class | Name of the chemical component |
|---|---|---|
| 13.0 | AI | 4-pentyl-4'-cyanobiphenyl |
| 13.0 | AI | 4-heptyl-4'-cyanobiphenyl |
| 6.3 | AI and AIV | 3-fluoro-4-cyanophenyl-4'-ethylbenzoate |
| 10.8 | AI and AIV | 3-fluoro-4-cyanophenyl-4'-propylbenzoate |
| 12.1 | AI and AIV | 3-fluoro-4-cyanophenyl-4'-butylbenzoate |
| 12.1 | AI and AIV | 3-fluoro-4-cyanophenyl-4'-pentylbenzoate |
| 14.0 | EI | 4-pentylphenyl-4'-pentylcyclohexylcarboxylate |
| 8.6 | AIV | 4-cyanophenyl-4'-trans-butyl-cyclohexylbenzoate |
| 4.2 | AIV | 3-fluoro-4-cyanophenyl-4'-trans-pentyl-cyclohexylbenzoate |
| 3.9 | BI | 4,4'-Bis (4-propyl-cyclohexyl)-3-fluorobiphenyl |
| 2.7 | BI | 4,4'-Bis (4-propyl-cyclohexyl)-biphenyl |

$T_{N-I}=+61°$ C.; $T_{X-N}<-16°$ C.; $\Delta T_N>77°$ C.
$U_{\lambda/2}=12.8$ V at $T_{red}=0.9$; $U_{\lambda/2}=14.2$ V at T=20° C.

The last example is particularly interesting; it confirms the difference between mixtures optimised for displays with anchoring breaking and mixtures optimised for conventional displays. Mixtures with weak anchoring are necessary to lower the consumption and price of control electronics for anchoring breaking displays ($U_{\lambda/2}<25V$ (surface property)); with classical displays, the same result is obtained by lowering the Fréedericksz threshold voltage (volume property).

Example 11 shows that these two properties are not directly related. This mixture only contains 50% of polar materials. Its dielectric anisotropy and its optical birefringence are significantly less than corresponding values in other examples. This makes its Fréedericksz threshold increase significantly (1 V instead of 0.6 V). It would be considered as being average for a conventional display. It is better than the other examples for an anchoring breaking display; its anchoring is identical but its weak birefringence means that a thicker cell can be used, which is therefore easier to make.

Example 11

| Concentration [% by weight] | Chemical class | Name of the chemical component |
|---|---|---|
| 14.3 | AI | 4-pentyl-4'-cyanobiphenyl |
| 10.4 | AI | 4-heptyl-4'-cyanobiphenyl |
| 3.0 | AI and AIV | 3-fluoro-4-cyanophenyl-4'-ethylbenzoate |
| 4.9 | AI and AIV | 3-fluoro-4-cyanophenyl-4'-propylbenzoate |
| 5.8 | AI and AIV | 3-fluoro-4-cyanophenyl-4'-butylbenzoate |
| 6.4 | AI and AIV | 3-fluoro-4-cyanophenyl-4'-pentylbenzoate |
| 5.4 | A.II | 4-pentyl-trans-cyclohexyl-benzoate-4'-phenyl-carboxylate of 4-cyano-3-fluorobenzene |
| 5.4 | A.II | 4-pentyl-trans-cyclohexyl-benzoate-4'-phenyl-carboxylate of 4-cyano-3-fluorobenzene |
| 8.4 | E.I | 4-pentylphenyl-4'-propylcyclohexycarboxylate |
| 5.2 | E.I | 4-pentylphenyl-4'-pentylcyclohexycarboxylate |
| 12.1 | B.I | 4-pentylphenyl-4'-propylphenylcarboxylate |
| 7.5 | B.I | 4-pentylphenyl-4'-pentylphenylcarboxylate |
| 4.2 | B.I | 4,4'-Bis-(4-propyl-cyclohexyl)-biphenyl |
| 4.1 | B.I | 4-propylcyclohexyl-4'-pentylcyclohexyl biphenyl |
| 4.1 | B.I | 4-propylphenylethynyl-4'-butyl phenyl |
| 4.2 | B.I | 4-hexylcarboxyphenylethynyl-4'-hexylcarboxyl phenyl |

$T_{N-I}=+58C$; $T_{X-N}=-3°$ C.; $\Delta T_N=61°$ C.
$U_{\lambda/2}=15.7$ V at $T_{red}=0.9$; $U_{\lambda/2}=16.3$ V at T=20° C.

What is claimed is:

1. A nematic liquid crystal medium with weak zenithal anchoring energy for bistable display devices, comprising:
    a) at least 40% by weight of compounds with strong molecular polarisability ($\Delta\epsilon>10$) and strong dipole moment ($\mu>1D$), however with weak zenithal anchoring, the compounds including:
    AI compounds selected from the group consisting of 4-pentyl-4'-cyanobiphenyl, 4-heptyl-4'-cyanobiphenyl, 3-fluoro-4-cyanophenyl-4'-ethylbenzoate, 3-fluoro-4-cyanophenyl-4'-propylbenzoate, 3-fluoro-4-cyanophenyl-4'-butylbenzoate and 3-fluoro-4-cyanophenyl-4'-pentylbenzoate; and
    AII or AIV compounds selected from the group consisting of 4-cyanophenyl-4'-trans-butyl-cyclohexylbenzoate, 3-fluoro-4-cyanophenyl-4'-trans-pentyl-cyclohexyl-benzoate and 4-pentyl-trans-cyclohexyl-benzoate-4'-phenyl-carboxylate of 4-cyano-3-fluorobenzene b) 0 to 50% by weight of compounds with weak anchoring selected from the group consisting of 4-pentylphenyl-4'-pentylcyclohexyl-carboxylate, 4-pentylphenyl-4'-propylcyclohexylcarboxylate, 4,4'-bis(4-propyl-cyclohexyl)-3-fluorobiphenyl, 4,4'-bis(4-propyl-cyclohexyl)-biphenyl, 4-pentylphenyl-4'-propylcyclohexylcarboxylate, 4-pentylphenyl-4'-propylphenylcarboxylate, 4-pentylphenyl-4'-pentylphenylcarboxylate, 4-propylphenylethynyl-4'-butylphenyl and 4-hexylcarboxyphenylethynyl-4'-hexylcarboxylphenyl;

wherein the relative proportions of the above-mentioned compounds used in the composition of the nematic liquid crystal mixture are determined to simultaneously obtain the following physical characteristics for the said mixture:

a nematic-isotropic liquid transition temperature ($T_{N-I}$) of the liquid crystal mixture greater than or equal to +50° C., a nematic range $\Delta T_{TN}$ of the liquid crystal mixture greater than or equal to 50° C., a positive dielectric anisotropy larger than or equal to $8 \times 10^{-11}$ F/m (value measured at a temperature of +20° C.).

a weak zenithal anchoring on at least one of the plates of the bistable display, characterised by a breaking voltage $U_{\lambda/2} > 25$ volts for a cell with thickness d such that $\Delta n\, d = 295$ nm (value measured at a temperature of +20° C.).

2. The nematic liquid crystal mixture according to claim 1, having the following composition:

|  | % by weight |
| --- | --- |
| 4-pentyl-4'-cyanobiphenyl | 13.0 |
| 4-heptyl-4'-cyanobiphenyl | 13.0 |
| 3-fluoro-4-cyanophenyl-4'-ethylbenzoate | 6.3 |
| 3-fluoro-4-cyanophenyl-4'-propylbenzoate | 10.8 |
| 3-fluoro-4-cyanophenyl-4'-butylbenzoate | 12.1 |
| 3-fluoro-4-cyanophenyl-4'-pentylbenzoate | 12.1 |
| 4-pentylphenyl-4'-pentylcyclohexycarboxylate | 14.0 |
| 4-cyanophenyl-4'-trans-butyl-cyclohexyl benzoate | 8.6 |
| 3-fluoro-4-cyanophenyl-4'-trans-pentyl-cyclohexyl benzoate | 4.2 |

-continued

|  | % by weight |
| --- | --- |
| 4,4'-Bis-(4-propyl-cyclohexyl-3-fluorobiphenyl | 3.9 |
| 4,4'-Bis-(4-propyl-cyclohexyl)-biphenyl | 2.7. |

3. The nematic liquid crystal mixture according to claim 1, having the following composition:

|  | % by weight |
| --- | --- |
| 4-pentyl-4'-cyanobiphenyl | 14.3 |
| 4-heptyl-4'-cyanobiphenyl | 10.4 |
| 3-fluoro-4-cyanophenyl-4'-ethylbenzoate | 3.0 |
| 3-fluoro-4-cyanophenyl-4'-propylbenzoate | 4.9 |
| 3-fluoro-4-cyanophenyl-4'-butylbenzoate | 5.8 |
| 3-fluoro-4-cyanophenyl-4'-pentylbenzoate | 6.4 |
| 4-pentyl-trans-cyclohexyl-benzoate-4'-phenyl-carboxylate of 4-cyano-3-fluorobenzene | 5.4 |
| 4-pentylphenyl-4'-propylcyclohexycarboxylate | 8.4 |
| 4-pentylphenyl-4'-pentylcyclohexycarboxylate | 5.2 |
| 4-pentylphenyl-4'-propylphenylcarboxylate | 12.1 |
| 4-pentylphenyl-4'-pentylphenylcarboxylate | 7.5 |
| 4,4'-bis-(4-propyl-cyclohexyl)-biphenyl | 4.2 |
| 4-propylcyclohexyl-4'-pentylcycloxyl biphenyl | 4.1 |
| 4-propylphenylethynyl-4'-butyl phenyl | 4.1 |
| 4-hexylcarboxyphenylethynyl-4'-hexylcarboxyl phenyl | 4.2. |

4. The bistable display device, comprising a nematic liquid crystal mixture with weak zenithal anchoring energy, according to claim 1.

5. The bistable display device according to claim 4, which is of the anchoring breaking type.

6. The bistable display device according to claim 5, wherein the screen is a device that uses two textures, one uniform or slightly twisted texture in which the molecules are at least approximately parallel to each other, and the other that differs from the first by a twist of +1–180°, switching between these two textures being made by breaking the anchoring on at least one of the substrates.

7. A method of using a liquid crystal mixture according to claim 1 in a bistable display device.

* * * * *